J. SIMON.
UNIVERSAL JOINT DEVICE.
APPLICATION FILED SEPT. 2, 1908.

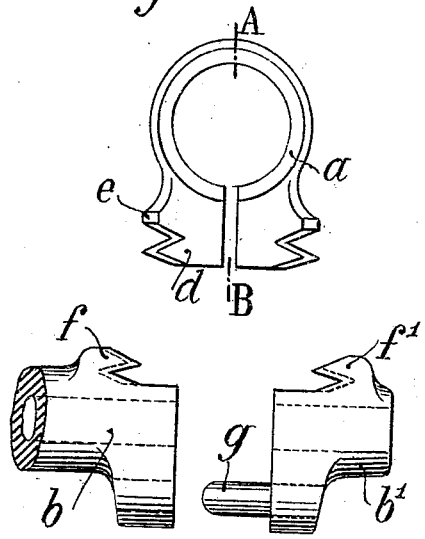
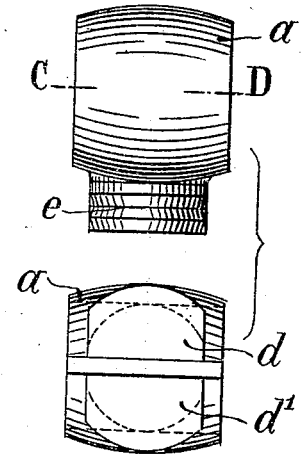
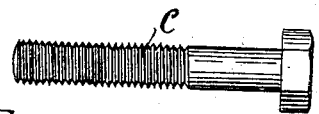
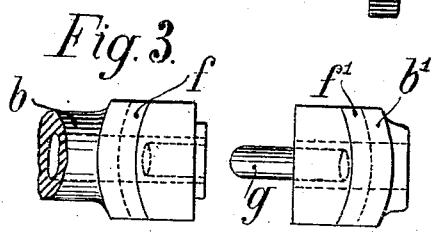
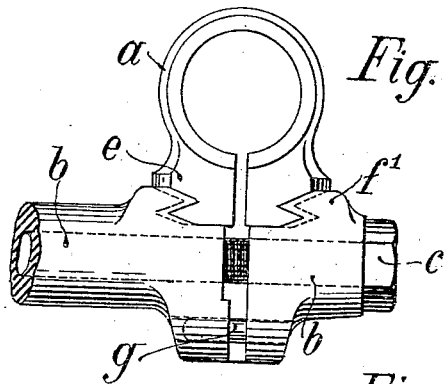
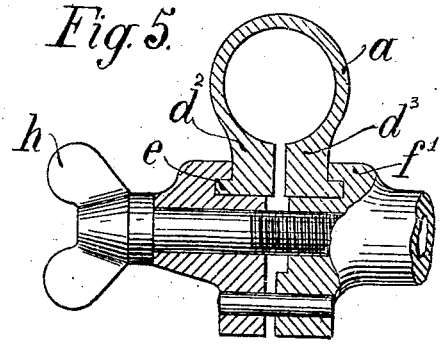
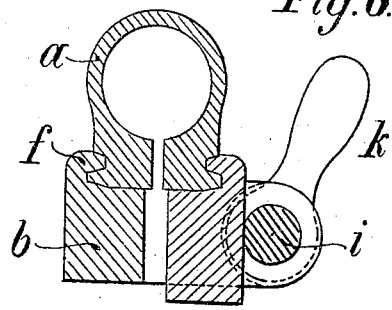

943,573.

Patented Dec. 14, 1909.
2 SHEETS—SHEET 2.

Witnesses
J. M. Wynkoop
L. R. Nevitt

Inventor
Julien Simon
By Knight Bros
Attys

UNITED STATES PATENT OFFICE.

JULIEN SIMON, OF VINCENNES, FRANCE.

UNIVERSAL-JOINT DEVICE.

943,573.  Specification of Letters Patent.  Patented Dec. 14, 1909.

Application filed September 2, 1908. Serial No. 451,381.

*To all whom it may concern:*

Be it known that I, JULIEN SIMON, a citizen of the French Republic, residing at Vincennes, in the Republic of France, have invented a new and useful Improvement in Universal-Joint Devices, of which the following is a specification.

The object of the present invention is an improved arrangement for universal joints, characterized by the fact that by operating a single fixing or fastening organ (bolt, cam and the like) it allows of the immobilization, in any position whatsoever compatible with the connections of the system, of two pieces intended to turn around two rectangular axes.

The annexed drawing gives by way of example some of the ways in which my invention may be carried out, and its application to the handle bar of a bicycle, tricycle, motorcycle and the like, but this application is only given as an example, as my invention may be used as a joint between any other mechanical organs.

Figure 7:
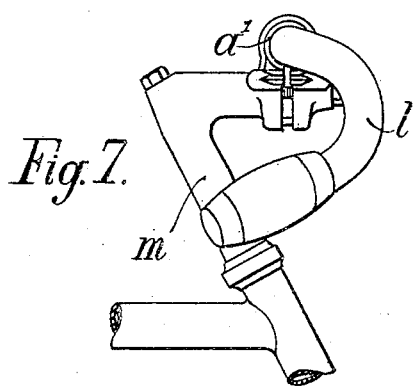
Figure 8:
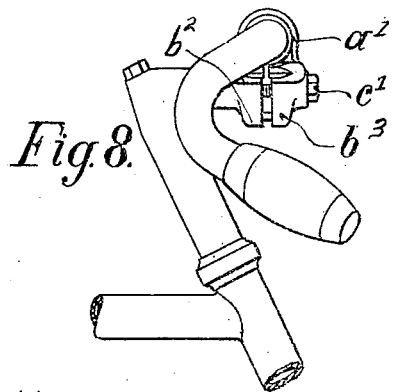
Figure 11:
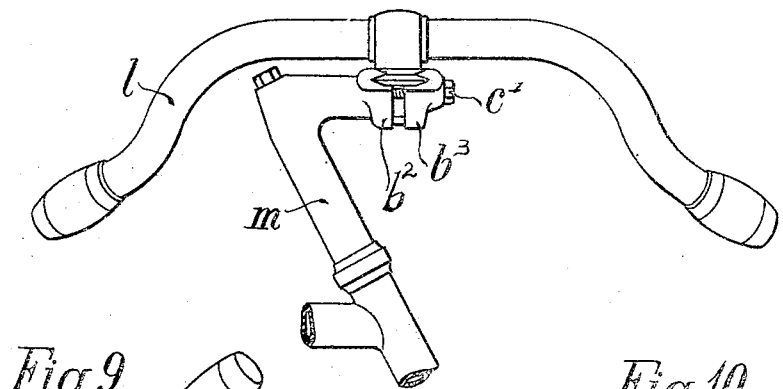
Figure 9:
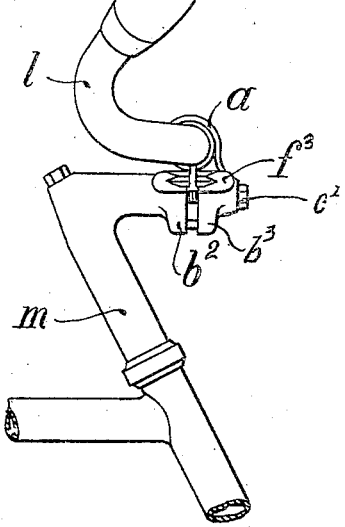
Figure 10:
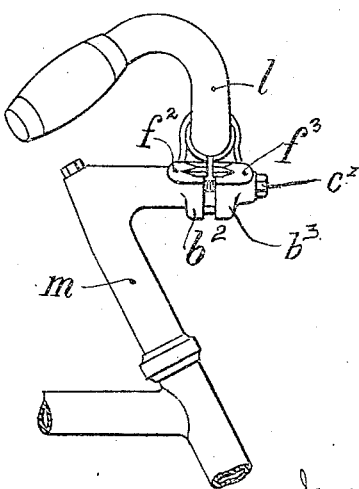

In the drawing: Figure 1 shows an elevation of the four separated parts forming the joint; Fig. 2 represents a front view and plan of one of these parts; Fig. 3 represents in plan two other parts; Fig. 4 is a similar view to Fig. 1, but in it the various parts are in their respective positions; Figs. 5 and 6 show two modified constructions of the joint; Figs. 7 to 11 represent one application of my invention.

The joint embodied in my invention is essentially composed of three parts: a split hollow sleeve $a$, a blockhead in the form of a vise, itself composed of two parts $b$ and $b^1$ and in the third place a bolt $c$ for connecting the portions together. The split sleeve $a$ possesses two perpendicular axes of symmetry A B and C D and the object of the joint is to make the two organs between them rigid or fastened in any position whatsoever, one organ being arranged to turn around axis A B while the other turns around axis C D. The organ intended to turn around axis C D must simply bear a cylindrical seat, constructed according to the internal diameter of the sleeve $a$; when the two parts $d$ $d^1$ of the tail of the sleeve are brought together by any suitable means, the first organ is fixed in any desired position with regard to the axis C D. The second organ intended to turn around the axis A B should first be made integral with one of the parts $b$ or $b^1$, it may be either joined to one of these parts or it may also be constructed in one piece with it; in the example shown the part $b$ is supposed to be part of that organ.

To allow of the junction of the two organs, the tailpiece $d$ $d^1$ of sleeve $a$ is fitted with a circular collar $e$ encircling the axis A B, and the blockheads $f$ $f^1$ of parts $b$ $b^1$ are also circular and correspond exactly in profile to that of the collar $e$ as shown in Fig. 1. In the example given the profile of the collar $e$ is in the form of a let-in wedge and the blockheads $f$ $f^1$ are in the form of projecting wedges; but exactly the contrary may be done, and the collar $e$ could take in section any other form provided only that once said collar in inclosed between the blockheads $f$ $f^1$ the sleeve $a$ cannot be separated from parts $b$ $b^1$ even if the latter have a slight play, that is to say if the space between the two parts $b$ $b^1$ is a little greater than the diameter of the collar $e$. Thus Fig. 5 shows a modified construction for this collar and consequently for the blockheads also.

The collar $e$ of the blockheads $f$ may be entirely or almost entirely circular. In this case, for disengaging or separating the two organs, it is necessary to completely separate parts $b$ and $b^1$ from the blockhead. To avoid any necessity for this complete separation in the example shown, a flat form (see plans Figs. 1 and 2) has been given to the collar $e$ and the blockheads $f$ $f^1$ thus allowing the collar $e$ to be disengaged from the blockhead when the latter is slightly loosened; for this purpose it is only necessary to give the sleeve $a$ a quarter turn around the axis A B so as to bring it into position (Fig. 2); in that position it can be detached easily from the blockhead.

To allow of the various portions of the apparatus being put together, parts $b$ and $b^1$ are topped for receiving the bolt $c$ and to avoid the relative rotation of part $b^1$ with regard to part $b$, the latter is furthermore fitted with a peg $g$ which penetrates into a hole formed in part $b$. Once the collar $e$ is engaged between the blockheads, the first organ is brought into the desired position around its axis C D, and then it is turned with the sleeve $a$ around axis A B to bring it into the desired position in relation to the second organ, and when this result is obtained, the screw $c$ is tightened so that the two organs are fixed rigidly in their respective positions. To modify the reciprocal position of the two organs, the bolt $c$ is simply loosened slightly, this giving entire liberty to each portion. The bolt $c$ may obviously be replaced by any other tightening organ, such as a wing nut $h$ (Fig. 5) or an eccentric or cam $i$ governed by a lever $k$ (Fig. 6); any other means of tightening may be used to allow the simultaneous bringing together of the two parts $d^2$ and $d^3$ of the tail of the sleeve $a$ and the two parts $f$ $f^1$ of the blockhead or vise $b$ $b^1$.

Figs. 7 to 11 show one application of my joint in conformity with the present invention. In this application the handle bar $l$ of a cycle must be firmly fixed in certain relative positions with its frame $m$; for this purpose the sleeve $a^1$ is placed in the middle of the handle bar $l$ and part $b^2$ of the vise $b^2$ $b^3$ having the block-heads $f^2$ $f^3$ is cast in one with the corresponding part $m$ of the frame. In loosening the bolt $c^1$ the handle bar is allowed to turn around the axis $C^1$ $D^1$ of the sleeve $a^1$ and at the same time the whole of the handle bar and the sleeve $a^1$ pivot around axis A B. These movements permit of the handle bar being successively brought into one of the positions shown in Figs. 7, 8, 9, 10, and 11. This last position is particularly useful when the machine is to be housed as it lessens the space occupied.

Having now particularly described my invention and in what manner the same is to be performed, I declare that what I claim is:

1. The combination in a universal joint of a split sleeve $a$ the tail of which is fitted with a circular collar $e$ for turning around a transverse axis of symmetry of the sleeve, and of a vise $b$ $b^1$ bearing circular blockheads $f$ $f^1$ whose profile corresponds to that of the collar $e$; the two portions of this vise being brought together by suitable means to simultaneously fix the organ intended to turn around the longitudinal axis of the sleeve $a$ and inside of it, and the organ integral with the vise, which latter is made to turn around the transverse axis of the sleeve $a$ and consequently in relation to the first organ.

2. The combination in a universal joint of a split sleeve having its tail provided with a circular collar, a vise having circular blockheads of a profile corresponding to that of the collar and between which the collar fits, and means for moving the blockheads toward each other whereby to simultaneously fix the members connected by the joint.

The foregoing specification signed at Paris this 14th day of August, 1908.

JULIEN SIMON.

In presence of two witnesses:
DEAN B. MASON,
EDOUARD WOLF.